US009330677B2

(12) United States Patent
Ruwisch

(10) Patent No.: US 9,330,677 B2
(45) Date of Patent: May 3, 2016

(54) METHOD AND APPARATUS FOR GENERATING A NOISE REDUCED AUDIO SIGNAL USING A MICROPHONE ARRAY

(71) Applicant: Dietmar Ruwisch, Berlin (DE)

(72) Inventor: Dietmar Ruwisch, Berlin (DE)

( * ) Notice: Subject to any disclaimer, the term of this patent is extended or adjusted under 35 U.S.C. 154(b) by 152 days.

(21) Appl. No.: 14/148,230

(22) Filed: Jan. 6, 2014

(65) Prior Publication Data

US 2014/0193000 A1 Jul. 10, 2014

Related U.S. Application Data

(60) Provisional application No. 61/749,535, filed on Jan. 7, 2013.

(51) Int. Cl.

| | |
|---|---|
| ***H04B 15/00*** | (2006.01) |
| ***G10L 21/0264*** | (2013.01) |
| ***G10L 21/0232*** | (2013.01) |
| *G10L 21/0216* | (2013.01) |

(52) U.S. Cl.

CPC ......... *G10L 21/0264* (2013.01); *G10L 21/0232* (2013.01); *G10L 2021/02166* (2013.01)

(58) Field of Classification Search

USPC ........ 381/56, 71.1, 71.11, 71.12, 71.14, 94.1, 381/94.2, 94.3, 119, 122; 700/94; 704/226

See application file for complete search history.

(56) References Cited

U.S. PATENT DOCUMENTS

| | | | |
|---|---|---|---|
| 6,683,961 | B2 | 1/2004 | Ruwisch |
| 6,820,053 | B1 | 11/2004 | Ruwisch |
| 7,327,852 | B2 | 2/2008 | Ruwisch |
| 8,340,321 | B2 | 12/2012 | Ruwisch |
| 2003/0179888 | A1 | 9/2003 | Burnett et al. |
| 2007/0263847 | A1 | 11/2007 | Konchitsky |
| 2011/0257967 | A1 | 10/2011 | Every et al. |
| 2013/0117016 | A1 | 5/2013 | Ruwisch |

FOREIGN PATENT DOCUMENTS

| | | |
|---|---|---|
| WO | WO 03/043374 | 5/2003 |
| WO | WO 2006/041735 | 4/2006 |

*Primary Examiner* — Vivian Chin
*Assistant Examiner* — Friedrich W Fahnert
(74) *Attorney, Agent, or Firm* — Harrity & Harrity, LLP

(57) ABSTRACT

A method and apparatus for generating a noise reduced output signal from sound received by a first and second microphone arranged as a microphone array. The method includes transforming sound received by the first microphone into a first input signal and sound received by a second microphone into a second input signal and calculating, for each of the frequency components, a weighted sum of at least two intermediate signals calculated from the input signals by means of complex valued transfer functions and real valued Equalizer functions. The method includes a weighing function with range between zero and one, with quotients of signal energies of the intermediate functions as arguments of the weighing function, and generating the noise reduced output signal based on the weighted sum of the intermediate functions and based on the weighted sum of the first and second intermediate function at each of the frequency components.

20 Claims, 4 Drawing Sheets

Microphone array with frontal focus (hatched area)

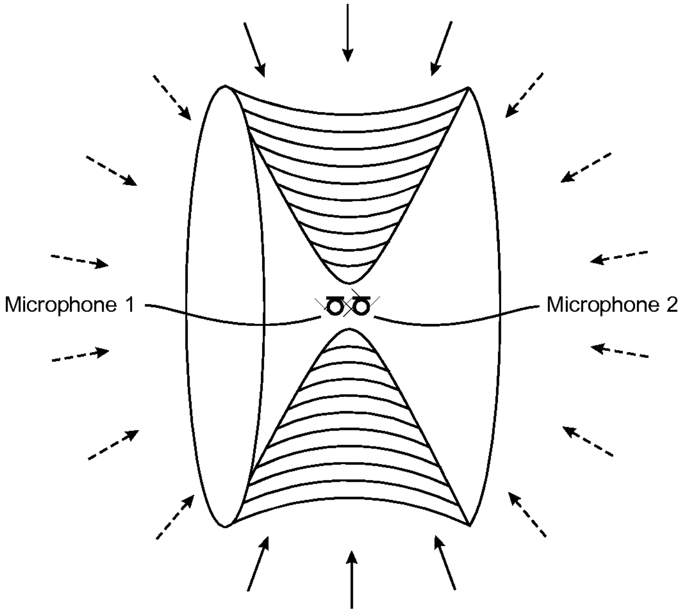
Fig. 1: Microphone array with frontal focus (hatched area)
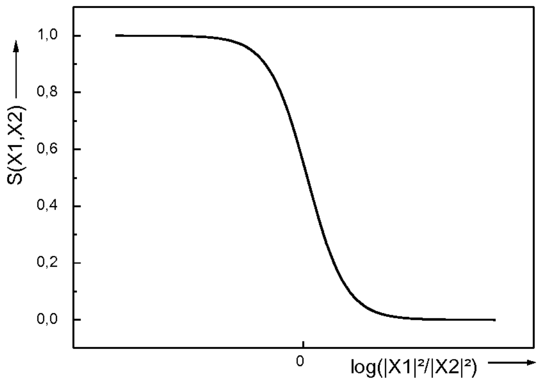
Fig. 2: Weighing Function S(x)

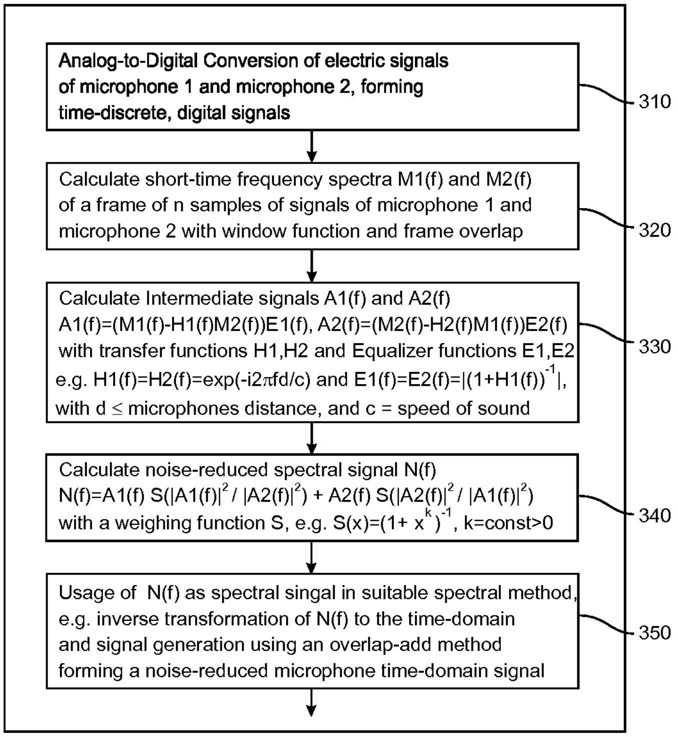
Fig. 3: Generation of noise reduced output signal
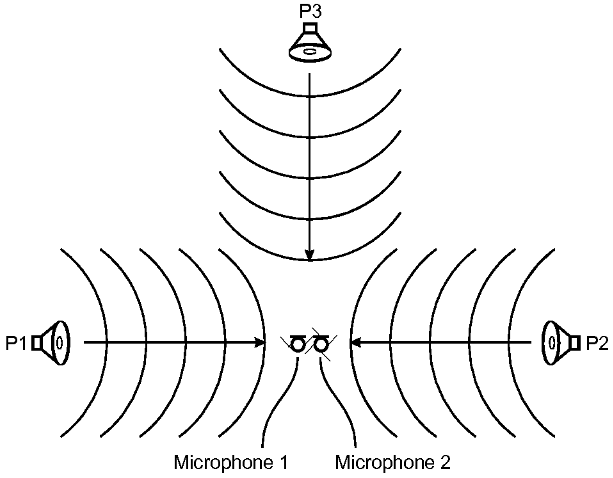
Fig. 4: Positions of calibration signals

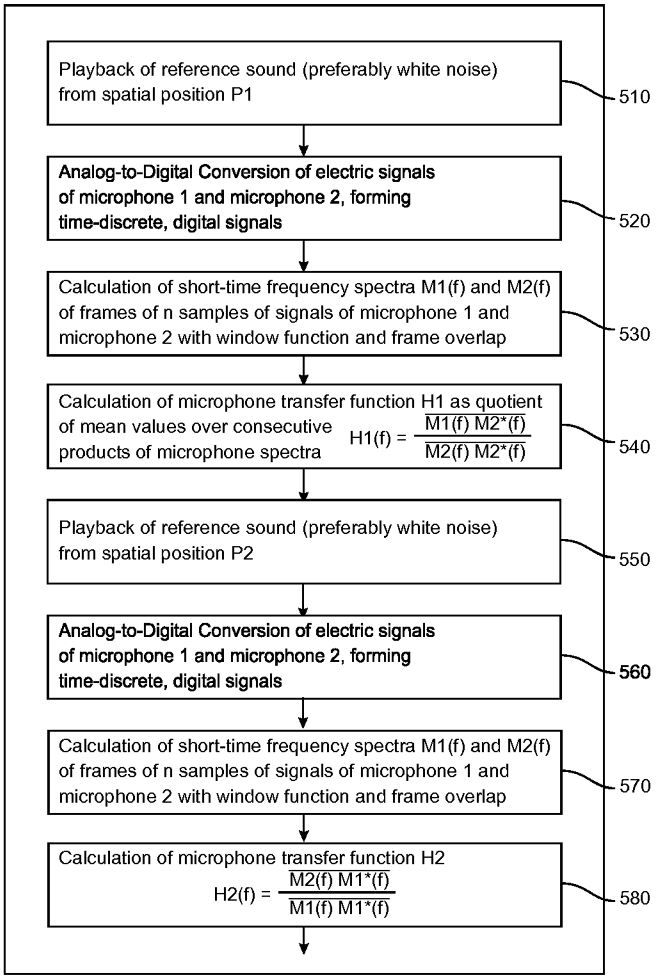
Fig. 5: Calibration of microphone transfer functions

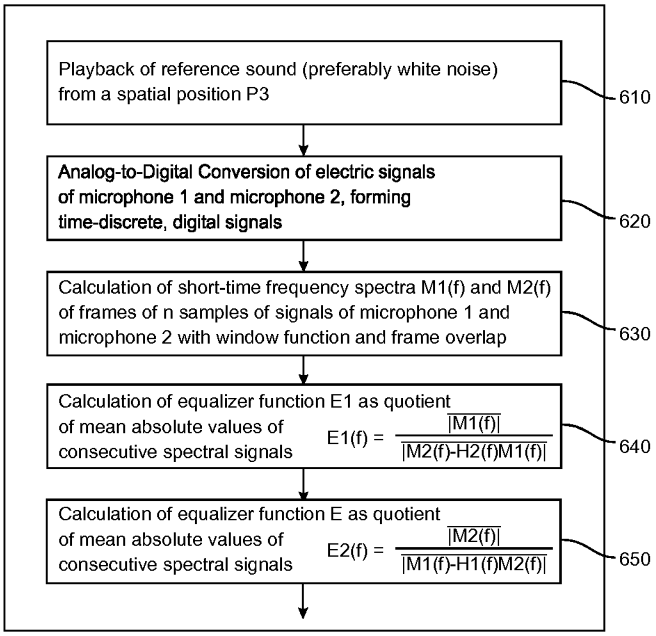
Fig. 6: Equalizer-Calibration

METHOD AND APPARATUS FOR GENERATING A NOISE REDUCED AUDIO SIGNAL USING A MICROPHONE ARRAY

RELATED APPLICATION

This application claims priority to U.S. Provisional Patent Application No. 61/749,535, filed Jan. 7, 2013, the contents of which are incorporated herein by reference.

FIELD OF INVENTION

The present invention generally relates to methods and apparatus for generating a noise reduced audio signal from sound received by communications apparatus. More particular, the present invention relates to ambient noise-reduction techniques for communications apparatus such as telephone handsets, especially mobile or cellular phones, tablet computers, walkie-talkies, hands-free phone sets, or the like. In the context of the present invention, "noise" and "ambient noise" shall have the meaning of any disturbance added to a desired sound signal like a voice signal of a certain user, such disturbance can be noise in the literal sense, and also interfering voice of other speakers, or sound coming from loudspeakers, or any other sources of sound, not considered as the desired sound signal. "Noise Reduction" in the context of the present invention shall also have the meaning of focusing sound reception to a certain area or direction, e.g. the direction to a user's mouth, or more generally, to the sound signal source of interest.

BACKGROUND OF THE INVENTION

Telephone apparatuses, especially mobile phones, are often operated in noise polluted environments. Microphone(s) of the phone being designed to pick up the user's voice signal unavoidably pick up environmental noise, which leads to a degradation of communication comfort. Several methods are known to improve communication quality in such use cases. Normally, communication quality is improved by attempting to reduce the noise level without distorting the voice signal. There are methods that reduce the noise level of the microphone signal by means of assumptions about the nature of the noise, e.g. continuity in time. Such single-microphone methods as disclosed e.g. in German patent DE 199 48 308 C2 achieve a considerable level of noise reduction. Other methods as U.S. patent application 2011/0257967 utilize estimations of the signal-to-noise ratio and threshold levels of speech loss distortion. However, the voice quality of all single-microphone noise-reduction methods degrades if there is a high noise level, and a high noise suppression level is applied.

Other methods use an additional microphone for further improvement of the communication quality. Different geometries can be distinguished, which are addressed as methods with "symmetric microphones" or "asymmetric microphones". Symmetric microphones usually have a spacing as small as 1-2 cm between the microphones, where both microphones pick up the voice signal in a rather similar manner and there is no principle distinction between the microphones. Such methods as disclosed, e.g., in German patent DE 10 2004 005 998 B3 require information about the expected sound source location, i.e. the position of the user's mouth relative to the microphones, since geometric assumptions are the basis of such methods.

Further developments are capable of in-system adaptation, wherein the algorithm applied is able to cope with different and a-priori unknown positions of the sound source. However, such adaption requires noise-free situations to "calibrate" the system as disclosed, e.g. in German patent application DE 10 2010 001 935 A1.

"Asymmetric microphones" typically have greater distances of around 10 cm, and they are positioned in a way that the level of voice pick-up is as distinct as possible, i.e. one microphone faces the user's mouth, the other one is placed as far away as possible from the user's mouth, e.g. at the top edge or back side of a telephone handset. The goal of the asymmetric geometry is a difference of preferably approximately 10 dB in the voice signal level between the microphones. The simplest method of this kind just subtracts the signal of the "noise microphone" (away from user's mouth) from the "voice microphone" (near user's mouth), taking into account the distance if the microphones. However since the noise is not exactly the same in both microphones and its impact direction is usually unknown, the effect of such a simple approach is poor.

More advanced methods use a counterbalanced correction signal generator to attenuate environmental noise cf. U.S. patent application 2007/0263847. However, a method like this is limited to asymmetric microphone placements and cannot be easily expanded to other use cases.

More advanced methods try to estimate the time difference between signal components in both microphone signals by detecting certain features in the microphone signals in order to achieve a better noise reduction results, cf. e.g., patent application WO 2003/043374 A1. However, feature detection can get very difficult under certain conditions, e.g. if there is a high reverberation level. Removing such reverberation is another aspect of 2-microphone methods as disclosed, e.g., in patent application WO2006/041735 A2, in which spectro-temporal signal processing is applied.

In U.S. patent application 2003/0179888 a method is described that utilizes a Voice Activity Detector for distinguishing Voice and Noise in combination with a microphone array. However, such an approach fails if an unwanted disturbance seen as noise has the same characteristic as voice, or even is an undesired voice signal.

U.S. patent application Ser. No. 13/618,234 discloses a two-microphone noise reduction method, primarily for asymmetric microphone geometries, and with suitable pre-processing also for symmetric microphones, however, it is then limited to a lateral focus (sometimes referred to as end-fire beam forming).

All of the methods or systems known in the art are either asymmetric in the definition of microphones, or—where symmetric microphones are used—they prefer an end-fire beam direction with the microphones behind each other.

SUMMARY OF THE INVENTION

It is therefore an object of the present invention to provide improved and robust noise reduction methods and apparatus processing signals of at least two microphones using symmetric microphones in the sense of the above definition, utilizing a symmetric frontal focus with the microphones side by side instead of behind each other (also referred to as "Broad View Beam Forming"), whereas this is not a fundamental limitation of the present invention; also other focal directions are possible.

The invention, according to a first aspect, provides a method and an apparatus for generating a noise reduced output signal from sound received by at least two microphones.

According to an aspect, the method and apparatus are provided for generating a noise reduced output signal from sound received by a first second microphone arranged as microphone array. The method includes transforming the sound received by the first microphone into a first input signal and transforming sound received by a second microphone into a second input signal. The method includes calculating, for each of the plurality of frequency components, a weighted sum of at least two intermediate signals that are calculated from the input signals by means of complex valued transfer functions and real valued Equalizer functions. The method further includes a weighing function (also referred to as "weighting function") with range between zero and one, with quotients of signal energies of the intermediate functions as argument of the weighing function, and generating the noise reduced output signal based on the weighted sum of the intermediate functions, and generating the noise reduced output signal based on the weighted sum of the first and second intermediate function at each of the plurality of frequency components.

According to another aspect, the method includes transforming the sound received by the first microphone into a first input signal, where the first input signal is a short-time frequency domain signal of an analog-to-digital converted audio signal corresponding to the sound received by the first microphone and transforming sound received by a second microphone, into a second input signal, where the second input signal is a short-time frequency domain signal of an analog-to-digital converted audio signal corresponding to the sound received by the second microphone. The method also includes calculating, for each of the plurality of frequency components, a weighted sum of at least two intermediate signals that are calculated from the input signals by means of complex valued transfer functions and real valued Equalizer functions. The method further includes a weighing function with range between zero and one, with quotients of signal energies of said intermediate functions as argument of said weighing function, and generating the noise reduced output signal based on said weighted sum of said intermediate functions.

According to still another aspect, the apparatus includes a first microphone to transform sound received by the first microphone into a first input signal, where the first input signal is a frequency domain signal of an analog-to-digital converted audio signal corresponding to the sound received by the first microphone and a second microphone to transform sound received by the second microphone, into a second input signal, where the second input signal is a frequency domain signal of an analog-to-digital converted audio signal corresponding to the sound received by the second microphone. The apparatus also includes a processor to calculate, for each frequency component, a weighted sum of at least two intermediate signals that are calculated from input signal with complex valued microphone transfer functions and real valued equalizer functions, and a weighing function with range between zero and one and with quotients of signal energies of said intermediate functions as argument of said weighing function, and a noise reduced output signal based on said weighted sum of said intermediate functions. The frequency components are the spectral components of the respective frequency domain signal for each frequency f according to the time-to-frequency domain transformation, like, for example, a short-time Fourier transformation.

In this manner an apparatus for carrying out an embodiment of the invention can be implemented.

It is an advantage of the present invention that it provides a very stable two-microphone noise-reduction technique, which is able to provide effective frontal focus processing, also referred to as broad-view beam forming.

According to an embodiment, in the method according to an aspect of the invention, a first intermediate signal is calculated for each frequency component as equalized difference of the first input signal and the second input signal multiplied with a first microphone transfer function that is a complex-valued function of the frequency. Equalization is carried out as multiplication with a first equalizer function, which is a real-valued function of the frequency. A second intermediate signal is calculated as equalized difference of the second input signal and the first input signal multiplied with a second microphone transfer function that is a complex-valued function of the frequency; and equalization is carried out as multiplication with a second equalizer function, which is a real-valued function of the frequency.

According to an embodiment, in the method according to an aspect of the invention, the microphone transfer functions are calculated by means of an analytic formula incorporating the spatial distance of the microphones, and the speed of sound.

According to another embodiment, in the method according to an aspect of the invention, at least one microphone transfer function is calculated in a calibration procedure based on a reference signal, e.g. white noise, which is played back from a predefined spatial position. For calibration, input signals serve as calibration signals. A microphone transfer function is then calculated as complex-valued quotient of mean values of complex products of input signals, e.g. for the first microphone transfer function the enumerator is the mean product of the first input signal and the complex conjugated second input signal, and the denominator is the mean absolute square of the second input signal; and for the second microphone transfer function the enumerator is the mean product of the second input signal and the complex conjugated first input signal, and the denominator is the mean absolute square of the first input signal.

According to an embodiment, only the first microphone transfer function is calculated in the calibration process, and the second microphone transfer function is set equal to the first one.

According to an embodiment, the method further comprises a spectral smoothing process on the complex values of the calibrated transfer functions, such as spectral averaging, or polynomial interpolation, or fitting to a model function of first and or second microphone transfer function.

According to an embodiment, the first and or second equalizer function is calculated by means of an analytic formula incorporating the first and or second microphone transfer function.

According to an other embodiment, the first equalizer function is determined by means of a calibration process, where an equalizer calibration signal, preferably white noise, is played back from a third position being within the frontal focus of the microphone array, i.e. perpendicular to the axis connecting the microphones. Input signals are calculated from the microphone signals when the equalizer calibration signal is present, and for each of the plurality of frequencies, the first equalizer is calculated as quotient of the mean absolute value of the first input signal and the mean absolute value of the difference of the first input signal and the second input signal multiplied with the first microphone transfer function. Accordingly, the second equalizer is calculated as quotient of the mean absolute value of the second input signal and the mean absolute value of the difference of the second input signal and the first input signal multiplied with the second microphone transfer function.

By means of calibration it is possible to realize more asymmetric focal geometries, and to cope with effects caused by asymmetric microphone mounting, where sound impact to both microphones is somewhat different, e.g. because of obstacles in the acoustic path.

The noise reduced output signal according to an embodiment is used as replacement of a microphone signal in any suitable spectral signal processing method or apparatus.

In this manner a noise reduced time-domain output signal is generated by transforming the spectral noise-reduced output signal into a discrete time-domain signal by means of inverse Fourier Transform with an overlap-add technique on consecutive inverse Fourier Transform frames, which then can be further processed, or send to a communication channel, or output to a loudspeaker, or the like.

Still other objects, aspects and embodiments of the present invention will become apparent to those skilled in the art from the following description wherein embodiments of the invention will be described in greater detail.

BRIEF DESCRIPTION OF THE DRAWINGS

The invention will be readily understood from the following detailed description in conjunction with the accompanying drawings. As it will be realized, the invention is capable of other embodiments, and its several details are capable of modifications in various, obvious aspects all without departing from the invention. Accordingly, the drawings and descriptions will be regarded as illustrative in nature and not as restrictive. In the drawings:

FIG. 1 schematically shows the spatial shape of the area of sound acceptance according to an embodiment of the present invention;

FIG. 2 shows an exemplary graph of the weighing function according to an embodiment of the present invention;

FIG. 3 shows a flow diagram illustrating a method according to an embodiment of the present invention creating a noise reduced voice signal;

FIG. 4 shows exemplary spatial positions of calibration sound sources relative to the microphones according to an embodiment of the present invention;

FIG. 5 shows a flow diagram illustrating a method according to an embodiment of the present invention for calculating a microphone transfer function in a calibration process;

FIG. 6 shows a flow diagram illustrating a method according to an embodiment of the present invention for calculating an equalizer function in a calibration process.

DETAILED DESCRIPTION

In the following embodiments of the invention will be described. First of all, however, some terms will be defined and reference symbols are introduced.

c Speed of sound d spatial distance between microphones f Frequency of a component of a spectral domain signal M1(f) First Input Signal, spectral domain signal of first Microphone M2(f) Second Input Signal, spectral domain signal of second Microphone M1*(f) conjugate complex of M1(f)

$|M1(f)|^2=M1(f)\,M1^*(f)$, absolute square of M1(f)

E1(f) First Equalizer function

E2(f) Second Equalizer function

H1(f) First Microphone Transfer Function

H2(f) Second Microphone Transfer Function

A1(f) First intermediate Signal $A1(f)=(M1(f)-H1(f)M2(f))\,E1(f)$

A2(f) Second intermediate Signal $A2(f)=(M2(f)-H2(f)M1f))\,E2(f)$ $S(x\geq 0)$ Weighing function with $0\leq S(x)\leq 1$, e.g. $S(x)=(1+x^k)^{-1}$, k=const>0

N(f) Frequency-domain noise reduced output signal

P1, P2, P3 Spatial positions of Calibration signal sources $\overline{X}$ Mean value of variable X in time, calculated with a mean value method over consecutive values of X FIG. 1 illustrates the spatial shape of the sound acceptance area (hatched) of the frontal focus array formed by microphone 1 and microphone 2 according to the present invention. Sound from directions indicated by solid arrows is processed without or with only little attenuation, whereas sound from directions indicated by the dashed arrows undergoes attenuation.

FIG. 2 illustrates the shape of the weighing function S in logarithmic plotting by way of example. The domain of definition the weighing function is restricted to values greater than zero, near zero the value of the weighing function is near one, whereas for large numbers the weighing function tends to zero. Furthermore S(1)=½ is a property of the weighing function.

FIG. 3 shows a flow diagram of noise reduced output signal generation from sound received by microphones one and two according to the invention. Both microphone's time-domain signals are converted into time discrete digital signals (step 310). Blocks of a signal samples of both microphone signals are, after appropriate windowing (e.g. Hann Window), transformed into frequency domain signals M1(f) and M2(f) to generate first and second input signals, respectively, using a transformation method known in the art (e.g. Fast Fourier Transform) (step 320). M1(f) and M2(f) are addressed as complex-valued frequency domain signals distinguished by the frequency f. Intermediate signals A1(f) and A2(f) are calculated (step 330) according to an embodiment with microphone transfer functions H1(f) and H2(f) and equalizer functions E1(f) and E2(f), which may have the same number of components as input signals M1(f) and M2(f), distinguished by the frequency f. Microphone transfer functions H1(f) and H2(f) are complex valued and, by way of example, calculated as $H1(f)=H2(f)=\exp(-i2\pi fd/c)$, where d is smaller or equal to the spatial distance of microphone 1 and microphone 2, advisably between 1 and 2.5 cm, and c is the speed of sound 343 m/s at 20° C. and dry air. E1(f) and E2(f) are real valued and calculated by way of example as $E1(f)=E2(f)=|(1-H1(f))^{-1}|$.

The noise-reduced output signal in the spectral domain N(f) is calculated as weighted sum of intermediate signals A1(f) and A2(f) according to an embodiment as $N(f)=A1(f)\,S(|A1(f)|^2/|A2(f)|^2)+A2(f)\,S(|A2(f)|^2/|A1(f)|^2)$ with a weighing function S according to FIG. 2

According to an embodiment, the weighing function reads as $S(x)=(1+x^k)^{-1}$, with a positive constant k. In the limit $k\rightarrow 0$, N(f) is equal to A1(f) or A2(f), whichever has the smaller absolute square value at frequency f. N(f) can be further processed as spectral domain audio signal. It can be used in suitable spectral domain digital signal processing methods replacing a spectral domain microphone signal. According to an embodiment, N(f) is inverse-transferred to the time domain with state of the art transformation methods such as inverse short time Fourier transform with suitable overlap-add technique. The resulting noise reduced time domain signal can be further processed in any way known in the art, e.g. sent over information transmission channels and converted into an acoustic signal by means of a loudspeaker, or the like.

FIG. 4 shows spatial positions P1, P2, and P3 of calibration sound sources that are used for calculating microphone transfer functions and or equalizer functions in a calibration process, which according to an other embodiment replaces the analytic determination of one or both microphone transfer functions H1(f), H2(f) and/or one or both Equalizer functions E1(f), E2(f). P1 is closer to the position of microphone 1 and, according to an embodiment, as far away as possible from microphone 2. P2 is closer to the position of microphone 2 and, according to an embodiment, as far away as possible from microphone 2. P3 has same or similar distance to both microphones, so it is located in the center of the frontal focus area according to FIG. 1. Physical distance of all positions P1, P2, and P3 should be in the typical distance of user to the microphones, say 0.5-1 Meter. Calibration sound is preferably white noise, duration of which is e.g. 10 Seconds.

FIG. 3 shows a flow diagram of calibration of microphone transfer functions H1(f) and H2(f). According to an embodiment, the first microphone transfer function H1(f) is calculated based on a calibration signal, preferable white noise, being played back at position P1 (step 510). While calibration sound is present, both microphone's time-domain signals are converted into time discrete digital signals (step 520). Blocks of a signal samples of both microphone signals are, after appropriate windowing (e.g. Hann Window), transformed into frequency domain signals M1(f) and M2(f) to generate first and second input signals, respectively, using a transformation method known in the art (e.g. Fast Fourier Transform) (step 530).

Products of first input signal M1(f) and conjugate complex second input signal M2*(f) are calculated component by component, and as long as the calibration signal at position P1 is present, for each of the plurality of frequencies a first mean value of consecutive products is formed with a mean method known in the art. In the same manner, a second mean value of the absolute square values of the second input signal is calculated. The quotient of first and second mean value forms the transfer function H1(f) for each of a plurality of frequencies (step 540):

$$H1(f) = \frac{\overline{M1(f)M2^*(f)}}{\overline{M2(f)M2^*(f)}}$$

The second microphone transfer function H2(f) is calculated based on a calibration signal, preferable white noise, being played back at position P2 (step 550). While calibration sound is present, both microphone's time-domain signals are converted into time discrete digital signals (step 560). Blocks of a signal samples of both microphone signals are, after appropriate windowing (e.g. Hann Window), transformed into frequency domain signals M1(f) and M2(f) to generate first and second input signals, respectively, using a transformation method known in the art (e.g. Fast Fourier Transform) (step 570).

Products of second input signal, M2(f), and conjugate complex first input signal, M1*(f), are calculated component by component, and as long as the calibration signal at position P2 is present, for each of the plurality of frequencies a third mean value of consecutive products is formed with a mean method known in the art. In the same manner, a fourth mean value of the absolute square values of the first input signal is calculated. The quotient of third and fourth mean value forms the transfer function H2(f) for each of a plurality of frequencies: (step 580):

$$H2(f) = \frac{\overline{M2(f)M1^*(f)}}{\overline{M1(f)M1^*(f)}}$$

According to an embodiment, only one microphone transfer function is calculated in a calibration process, and the second transfer function is set equal to the first one, or is calculated analytically.

FIG. 6 shows a flow diagram of equalizer calibration. According to an embodiment, the first equalizer function E1(f) is calculated based on a calibration signal, preferable white noise, being played back at position P3 (step 610). While calibration sound is present, both microphone's time-domain signals are converted into time discrete digital signals (step 620). Blocks of a signal samples of both microphone signals are, after appropriate windowing (e.g. Hann Window), transformed into frequency domain signals M1(f) and M2(f) to generate first and second input signals, respectively, using a transformation method known in the art (e.g. Fast Fourier Transform) (step 630). Absolute values of input signal M1(f) as well as of M1(f)−H1(f)M2(f) are calculated and mean values over consecutive absolute values are calculated with a mean method known in the art. The first equalizer function E1(f) is then calculated as quotient of mean values, for each of a plurality of frequencies, as (step 640):

$$E1(f) = \frac{\overline{|M1(f)|}}{\overline{|M1(f) - H1(f)M2(f)|}}$$

Furthermore, absolute values of input signal M2(f) as well as of M2(f)−H2(f)M1(f) are calculated and mean values over consecutive absolute values are calculated with a mean method known in the art. The second equalizer function E2(f) is then calculated as quotient of mean values, for each of a plurality of frequencies, as (step 650):

$$E2(f) = \frac{\overline{|M2(f)|}}{\overline{|M2(f) - H2(f)M1(f)|}}$$

According to an embodiment, only one equalizer function is calculated in a calibration process, and the second transfer function is set equal to the first one, or is calculated without individual calibration.

According to an embodiment, one or more of the calibration steps are not only performed once prior to operation, but carried out during normal operation with operational sound information instead of calibration sound such as white noise. By this means the method is capable of automatic re-adjustment during operation in order to cope with any changes like microphone degradation over time, or to special use cases that does not meet the prerequisites of initial calibration.

The methods as described herein in connection with embodiments of the present invention can also be combined with other microphone array techniques, where at least two microphones are used. The noise-reduced output signal of the present invention can e.g. replace the voice microphone signal in a method as disclosed in U.S. patent application Ser. No. 13/618,234. Or the noise reduced output signals are further processed by applying signal processing techniques as, e.g., described in German patent DE 10 2004 005 998 B3, which discloses methods for separating acoustic signals from a plurality of acoustic sound signals by two symmetric microphones. As described in German patent DE 10 2004 005 998 B3, the noise reduced output signals are then further processed by applying a filter function to their signal spectra wherein the filter function is selected so that acoustic signals from an area around a preferred angle of incidence are amplified relative to acoustic signals outside this area.

Another advantage of the described embodiments is the nature of the disclosed inventive methods, which smoothly allow sharing processing resources with another important feature of telephony, namely so called Acoustic Echo Cancelling as described, e.g., in German patent DE 100 43 064 B4. This German patent describes a technique using a filter system which is designed to remove loudspeaker-generated sound signals from a microphone signal. This technique is applied if the handset or the like is used in a hands-free mode instead of the standard handset mode. In hands-free mode, the telephone is operated in a bigger distance from the mouth, and the information of the Noise microphone is less useful. Instead, there is knowledge about the source signal of another disturbance, which is the signal of the handset loudspeaker. This disturbance must me removed from the Voice microphone signal by means of Acoustic Echo Cancelling. Because of synergy effects between the embodiments of the present invention and Acoustic Echo Cancelling, the complete set of required signal processing components can be implemented very resource-efficient, i.e. being used for carrying out the embodiments described therein as well as the Acoustic Echo Cancelling, and thus with low memory- and power-consumption of the overall apparatus leading to low energy consumption, which increases battery life times of such portable devices. Since saving energy is an important aspect of modern electronics ("green IT") this synergy further improves consumer acceptance and functionality of handsets or alike combining embodiments of the presents invention with Acoustic Echo Cancelling techniques as, e.g., referred to in German patent DE 100 43 064 B4.

It will be readily apparent to the skilled person that the methods, the elements, units and apparatuses described in connection with embodiments of the invention may be implemented in hardware, in software, or as a combination thereof. Embodiments of the invention and the elements of modules described in connection therewith may be implemented by a computer program or computer programs running on a computer or being executed by a microprocessor, DSP (digital signal processor), or the like. Computer program products according to embodiments of the present invention may take the form of any storage medium, data carrier, memory or the like suitable to store a computer program or computer programs comprising code portions for carrying out embodiments of the invention when being executed. Any apparatus implementing the invention may in particular take the form of a computer, DSP system, hands-free phone set in a vehicle or the like, or a mobile device such as a telephone handset, mobile phone, a smart phone, a PDA, tablet computer, or anything alike.

What is claimed is:

1. A method for generating a noise reduced output signal from sound received by a first microphone and a second microphone arranged as a microphone array, the method comprising:

transforming the sound received by the first microphone into a first input signal, wherein the first input signal is a frequency domain signal of an analog-to-digital converted audio signal corresponding to the sound received by the first microphone;

transforming the sound received by the second microphone into a second input signal, wherein the second input signal is a frequency domain signal of an analog-to-digital converted audio signal corresponding to the sound received by the second microphone;

calculating, for each of a plurality of frequency components, a weighted sum of at least two intermediate signals that are calculated from the first input signal and the second input signal based on at least one complex valued transfer function and at least one real valued equalizer function, the weighted sum being based on a weighing function that includes a range between zero and one, and signal energy quotients of the at least two intermediate signals as arguments; and generating the noise reduced output signal based on the weighted sum of the at least two intermediate signals at each of the plurality of frequency components.

2. The method of claim 1, where calculating the weighted sum comprises:

calculating a first intermediate signal, of the at least two intermediate signals and for each of the plurality of frequency components, based on an equalized difference of the first input signal and the second input signal multiplied by and based on a first microphone transfer function; and calculating a second intermediate signal, of the at least two intermediate signals and for each of the plurality of frequency components, based on an equalized difference of the second input signal and the first input signal multiplied by and based on a second microphone transfer function.

3. The method of claim 2, where the first microphone transfer function and the second microphone transfer function are based on a spatial distance between the first microphone and the second microphone, and based on a speed of sound.

4. The method of claim 2, where at least one of the first microphone transfer function or the second microphone transfer function is calculated in a calibration procedure based on a reference signal.

5. The method of claim 2, where the first microphone transfer function is calculated in a calibration procedure based on a reference signal, and the second microphone transfer function is set equal to the first microphone transfer function.

6. The method of claim 1, further comprising:

applying a spectral smoothing procedure to the at least two intermediate signals.

7. The method of claim 1, where calculating the weighted sum comprises:

calculating one of the at least two intermediate signals, for each of the plurality of frequency components, based on an analytic formula that includes a microphone transfer function.

8. An apparatus for generating a noise reduced output signal, the apparatus comprising:

a first microphone to transform sound received by the first microphone into a first input signal, wherein the first input signal is a frequency domain signal of an analog-to-digital converted audio signal corresponding to the sound received by first microphone;

a second microphone to transform sound received by the second microphone into a second input signal, the first microphone and the second microphone being arranged as a microphone array, wherein the second input signal is a frequency domain signal of an analog-to-digital converted audio signal corresponding to the sound received by the second microphone; and a processor to:

calculate, for each of a plurality of frequency components, a weighted sum of at least two intermediate signals that are calculated from the first input signal and the second input signal based on at least one complex valued transfer function and at least one real valued equalizer function, the weighted sum being based on a weighing function that includes a range between zero and one, and signal energy quotients of the at least two intermediate signals as arguments; and generate the noise reduced output signal based on the weighted sum of the at least two intermediate signals at each of the plurality of frequency components.

9. The apparatus of claim 8, where, when calculating the weighted sum, the processor is to:

calculate a first intermediate signal, of the at least two intermediate signals and for each of the plurality of frequency components, based on an equalized difference of the first input signal and the second input signal multiplied by and based on a first microphone transfer function; and calculate a second intermediate signal, of the at least two intermediate signals and for each of the plurality of frequency components, based on an equalized difference of the second input signal and the first input signal multiplied by and based on a second microphone transfer function.

10. The apparatus of claim 9, where the first microphone transfer function and the second microphone transfer function are based on a spatial distance between the first microphone and the second microphone, and based on a speed of sound.

11. The apparatus of claim 9, where at least one of the first microphone transfer function or the second microphone transfer function is calculated in a calibration procedure based on a reference signal.

12. The apparatus of claim 9, where the first microphone transfer function is calculated in a calibration procedure based on a reference signal, and the second microphone transfer function is set equal to the first microphone transfer function.

13. The apparatus of claim 8, where the processor is further to:

apply a spectral smoothing procedure to the at least two intermediate signals.

14. The apparatus of claim 8, where, when calculating the weighted sum, the processor is to:

calculate one of the at least two intermediate signals, for each of the plurality of frequency components, based on an analytic formula that includes a microphone transfer function.

15. A non-transitory computer readable storage medium for storing computer executable program code for generating a noise reduced output signal from sound received by a first microphone and a second microphone arranged as a microphone array, the computer executable code comprising:

a code portion for transforming the sound received by the first microphone into a first input signal, wherein the first input signal is a frequency domain signal of an analog-to-digital converted audio signal corresponding to the sound received by the first microphone;

a code portion for transforming the sound received by the second microphone into a second input signal, wherein the second input signal is a frequency domain signal of an analog-to-digital converted audio signal corresponding to the sound received by the second microphone;

a code portion for calculating, for each of a plurality of frequency components, a weighted sum of at least two intermediate signals that are calculated from the first input signal and the second input signal based on at least one complex valued transfer function and at least one real valued equalizer function, the weighted sum being based on a weighing function that includes a range between zero and one, and signal energy quotients of the at least two intermediate signals as arguments; and a code portion for generating the noise reduced output signal based on the weighted sum of the at least two intermediate signals at each of the plurality of frequency components.

16. The non-transitory computer-readable storage medium of claim 15, where the code portion for calculating the weighted sum includes:

a code portion for calculating a first intermediate signal, of the at least two intermediate signals and for each of the plurality of frequency components, based on an equalized difference of the first input signal and the second input signal multiplied by and based on a first microphone transfer function; and a code portion for calculating a second intermediate signal, of the at least two intermediate signals and for each of the plurality of frequency components, based on an equalized difference of the second input signal and the first input signal multiplied by and based on a second microphone transfer function.

17. The non-transitory computer-readable storage medium of claim 16, where the first microphone transfer function and the second microphone transfer function are based on a spatial distance between the first microphone and the second microphone, and based on a speed of sound.

18. The non-transitory computer-readable storage medium of claim 16, where at least one of the first microphone transfer function or the second microphone transfer function is calculated in a calibration procedure based on a reference signal.

19. The non-transitory computer-readable storage medium of claim 16, where the first microphone transfer function is calculated in a calibration procedure based on a reference signal, and the second microphone transfer function is set equal to the first microphone transfer function.

20. The non-transitory computer-readable storage medium of claim 15, where the code portion for calculating the weighted sum includes:

a code portion for calculating one of the at least two intermediate signals, for each of the plurality of frequency components, based on an analytic formula that includes a microphone transfer function.

* * * * *